United States Patent Office 3,216,964
Patented Nov. 9, 1965

3,216,964
PLASTICIZED ALKENYL AROMATIC POLYMERS IN ADMIXTURE WITH METAL ALKOXIDES AND ALKYLS
Joseph D. Brubaker and Richard T. Dickerson, Midland, Mich., assignors to The Dow Chemical Company, Midland, Mich., a corporation of Delaware
No Drawing. Filed Dec. 23, 1964, Ser. No. 420,796
12 Claims. (Cl. 260—31.8)

This application is a continuation-in-part of application Serial No. 113,578, filed April 14, 1961, and now abandoned.

This invention relates to plasticized polymer compositions and a method for the preparation thereof. It more particularly relates to plasticizable alkenyl aromatic resin compositions and their preparation.

It is well known in the art that certain polymeric compositions such as alkenyl aromatic resins such as polystyrene and the like are inherently rigid and brittle. These characteristics are not generally modified without the loss of clarity and other desirable physical properties.

The invention is particularly adapted to be practiced with a thermoplastic styrene copolymer containing chemically combined in the polymer molecule a copolymerizable carboxylic acid monomer. Such a copolymer, which may have an essentially linear molecular configuration, is employed herein as being generally representative of alkenyl aromatic polymers of the type that contain at least about 50 weight percent of at least one polymerized alkenyl aromatic compound or monomer having the general formula $$Ar-CR=CH_2$$

wherein "R" is hydrogen or methyl and "Ar" is an aromatic radical of the benzene series containing from 6 to 10 carbon atoms (including the carbon atoms in any ring substitutents on the aromatic nucleus, and the $-CR=CH_2$ group is attached directly to a carbon of the aromatic ring) and from about 0.8 to 7.5 and beneficially from about 1 to about 5 weight percent of an unsaturated vinyl monomer selected from the group consisting of acrylic acid, methacrylic acid and vinyl benzoic acid, any balance being another ethylenically unsaturated monomer copolymerizable therewith.

It would be extremely advantageous if there were available a plasticizable composition comprising a major proportion of an alkenyl aromatic resin.

It would be further advantageous if such a composition were readily fabricated by techniques similar to those employed for polystyrene.

These benefits and other advantages are readily achieved by providing a copolymer comprising a major portion of an alkenyl aromatic monomer and a minor proportion of an ethylenically unsaturated carboxylic acid; incorporating into the polymer a minor proportion of an alkyl or alkoxide of a polyvalent metal, as hereinafter defined.

Suitable metallic compounds for the practice of the invention are the alkyls and alkoxides of barium, magnesium, aluminum, zinc, calcium and strontium, wherein each alkyl group of the alkoxide contains from 1–13 carbon atoms. Particularly beneficial and economic are such compounds as diethyl magnesium, diethoxy magnesium, triethyl aluminum, tributyl aluminum, tripropyl aluminum, triethoxy aluminum, tripropoxy aluminum and tributoxy aluminum. These are advantageous because of their ready availability and relatively low cost. The equivalent alkyl and alkoxy derivatives of zinc and calcium are also useful primarily because of the ease with which they may be prepared. The metal-containing alkoxy compounds employed in the invention are readily prepared by the method of United States Patent 2,570,058 employing any of the above-named metals. The metallic bases are suitably incorporated into the copolymer in a proportion of from about 1 to 6 percent based on the weight of the copolymer.

A wide variety of plasticizers may be employed with the composition of the invention. Typical of these are di-2-ethylhexyl phthalate, dioctyl phthalate, dibutyl phthalate, tricresyl phosphate, triphenyl phosphate and various polyether and polyester compounds. Beneficially, the plasticizers are employed in a proportion from about 2 to 60 parts by weight per hundred parts of the copolymer-metallic base composition.

Compositions in accordance with the invention are beneficially prepared by admixture of the components at a temperature above the softening point of the styrene polymer employed. Advantageously, the copolymeric material may be raised to its softening temperature or above by the use of compounding rolls, mixing extruders, sigma-blade mixers and the like known plastics processing equipment.

During mixing, it is advantageous to employ only sufficient heat to raise the temperature of the copolymeric material to the softening point as excessive heat gives rise to oxidation and other undesirable side reactions. Generally, a temperature of from about 320° Fahrenheit to 450° Fahrenheit is a suitable operating range for softening the copolymeric material. However, this temperature will vary depending on the specific copolymer employed. Once the polymeric mass has been raised to the softening temperature, the metal-containing compound may be added by simple admixture during the mechanical working of the mass.

Subsequent addition of the plasticizer or plasticizing agent may be made when the addition of the metal-containing compound is completed, in the same equipment, or alternately a plasticizer may be added at any time thereafter. Uusually it is advantageous to add the plasticizer immediately after the addition of the metal-containing compound, as cooling and reheating of the plastic mass will then be unnecessary.

The following examples are submitted for the purpose of illustration only and are not to be construed as limiting the scope of the invention in any way.

*Example 1*

A copolymer of 98 percent styrene and 2 percent methacrylic acid totalling 483 parts is milled into a blanket on compounding rolls which are heated to 370° Fahrenheit. 25.2 parts of aluminum isopropoxide are added gradually to the milled blanket. The addition of the aluminum isopropoxide results in a much stiffer sheet or blanket than originally produced by the copolymer alone. Milling of the blanket is continued and 207 parts of di-2-ethylhexyl phthalate are added and the milling continued to provide thorough dispersion of the phthalate plasticizer throughout the mass. After completion of the addition of di-2-ethylhexyl phthalate, the temperature of the rolls is reduced to about 50° Fahrenheit. The plasticized polymer is removed from the roll as a sheet. The resultant polymer composition is soft, flexible, transparent and rubbery after cooling to room temperature, but exhibits no tendency to be tacky or sticky. The product is readily molded into boxes and formed into sheets by calendering.

*Example 2*

The general procedure of Example 1 is employed utilizing 100 parts by weight of a copolymer of 98 weight percent styrene and 2 weight percent acrylic acid, 6 parts by weight of ditridecyloxy magnesium and 35 parts by weight of dioctyl phthalate. The resultant product is a soft, flexible, transparent material which is readily fabricated in the manner of the product of Example 1.

*Example 3*

Repetition of the procedure of Example 2 employing 4 parts of dioctyloxy magnesium instead of ditridecyloxy magnesium results in a product having properties of that of Example 2.

*Example 4*

Repetition of the procedure of Example 2 employing 3 parts by weight of diisoamyloxy magnesium provides a substantially similar product to that obtained in Example 2.

*Example 5*

Repetition of the procedure of Example 2 with the exception that the ditridecyloxy magnesium is replaced with 5 parts by weight of dimethoxy barium results in a product substantially similar to that of Example 2.

*Example 6*

A copolymer of 98.5 weight percent of tertiarybutylstyrene (a mixture of isomers wherein the tertiarybutyl group is attached directly to the benzene ring) and 1.5 weight percent of acrylic acid is prepared by heating the monomeric mixtures in the presence of 0.1 weight percent of benzoyl peroxide for 10 hours at 80° centigrade and after 10 hours, slowly raising the temperature over a period of 20 hours to 150° centigrade and maintaining the mixture at a temperature of 150° centigrade for 3 hours to provide substantially complete polymerization. The resultant copolymer is ground and milled into a blanket on compounding rolls, heated to a temperature of 400° Fahrenheit, and 2½ parts by weight of triisopropoxy aluminum are added per 100 parts by weight of the copolymer blanket. Subsequently, 40 parts by weight of butyl stearate are added and milling continued until a uniform mass is obtained. The resulting composition is soft and pliable and is readily molded into shaped articles and calendered into sheets.

*Example 7*

100 parts by weight of a copolymer of 98.5 weight percent tertiarybutylstyrene and 1.5 weight percent acrylic acid are milled into a blanket on compounding rolls heated to 400° Fahrenheit. As the blanket is milling, 2 parts by weight of triisobutyl aluminum dispersed in the mixture of 20 parts by weight of white paraffin oil and 20 parts by weight of diphenoxybenzene are added. The resultant product is soft and pliable and readily molded into shaped articles and calendered into sheets.

*Example 8*

The procedure of Example 7 is repeated except that 2.5 parts by weight of diethyl zinc are used in place of the triisobutyl aluminum. Substantially commensurate results are obtained.

In a similar manner to the foregoing examples, copolymers of 94 to 99 percent by weight styrene, vinyl toluene or ethyl toluene copolymerized with 6 to 1 percent by weight of acrylic acid, methacrylic acid, vinyl benzoic acid and the like and milled together with about 5 percent by weight (based on the weight of the total mixture) of aluminum isopropoxide, di(tridecanoxy) calcium, dioctyl zinc, dihexyl zinc, diethyl magnesium and diethoxy magnesum are readily plasticized by dioctyl phthalate, di-2-ethylhexyl phthalate, tricresyl phosphate and the like vinyl-type plasticizers to give transparent, formable, non-tacky compositions. Commensurate results are obtained when copolymers prepared from the following monomer mixtures are employed (all percentages are weight percent): 50 percent styrene, 45 percent methyl methacrylate, 5 percent acrylic acid; 85 percent n-vinyl toluene, 12 percent acrylonitrile, 3 percent vinyl benzoic acid; 90 percent styrene, 7 percent butadiene, 3 percent acrylic acid; 70 percent styrene, 26 percent o-vinyl toluene, 4 percent methacrylic acid; and 60 percent α-methylstyrene, 37 percent styrene, 3 percent acrylic acid.

By way of contrast, a tacky, soft material having a high degree of cold flow is obtained if compositions are prepared in the hereinbefore-described manner with the exception that the metal-containing compound is omitted; the product was tacky and subject to cold flow. By the term "vinyl-type plasticizer" is meant those plasticizers which are employed to plasticize such polymers as polyvinyl chloride and copolymers such as vinyl chloride-vinyl acetate, vinyl chloride-vinylidene chloride and the like.

Likewise, the example shows the use of di-2-ethylhexyl phthalate as the plasticizer component. A wide variety of other plasticizers commonly employed for plasticizing polyvinyl resin compositions are used instead for the purposes of the invention. Typical are the alkyl and aryl derivatives of the fatty acids, the phthalates, pelargonates, glycolates, sebacates, adipates, azelates and phosphates and petroleum oil fractions. These may be used as a single plasticizer or a mixture of several plasticizers specifically selected for special applications based on such solid film requirements as low volatility, non-flammability, low temperature flexibility, non-tacky properties, absence of odor, non-migration, non-toxicity and water insolubility.

Various other additives such as heat and light stabilizers, pigments, dyes and fillers are readily incorporated into compositions of the invention either during the compounding or mixing thereof or at a later time.

As is apparent from the specification, the composition and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A plastified composition consisting essentially of a plasticizable alkenyl aromatic resinous polymer,
   (a) the polymer containing in chemically combined form at least about 50 weight percent of at least one polymerized alkenyl aromatic compound having the general formula $$Ar-CR=CH_2$$

wherein R is selected from the group consisting of hydrogen and methyl, Ar is an aromatic radical of the benzene series containing from 6–10 carbon atoms including the carbon atoms in any ring substituents on the aromatic nucleus, the $-CR=CH_2$ group being attached directly to a carbon of the aromatic ring, from about 0.8–7.5 weight percent of an unsaturated vinyl monomer having a carboxylic acid group selected from the group consisting of acrylic acid, methacrylic acid and vinylbenzoic acid, any balance being another ethylenically unsaturated monomer copolymerizable therewith, from about 1 to about 6 weight percent based on the weight of the polymer of
   (b) a member selected from the group consisting of alkyls and alkoxides, wherein the alkyl groups contain from 1–13 carbon atoms, of a metal selected from the group consisting of barium, magnesium, aluminum, zinc, calcium and strontium and subsequently adding from about 2 to about 60 parts by weight per hundred parts by weight of the sum of the weights of (a) plus (b), of a plasticizer.

2. The composition of claim 1, wherein the copolymer has a major portion of styrene chemically combined therein.

3. The composition of claim 1, wherein (b) is an aluminum alkoxide.

4. The composition of claim 3, wherein the aluminum alkoxide is aluminum isopropoxide.

5. The composition of claim 1, wherein the copolymer has chemically combined in its polymer molecule from 95–99 weight percent of an alkenyl aromatic monomer and from 5–1 percent by weight of a copolymerizable unsaturated carboxylic acid monomer.

6. The composition of claim 5, wherein the copolymer has chemically combined therein about 98 percent styrene and about 2 percent methacrylic acid.

7. A method of preparing a plasticized alkenyl aromatic resinous polymer,
   (a) the polymer containing in chemically combined from at least about 50 weight percent of at least one polymerized alkenyl aromatic compound having the general formula $$Ar\text{---}CR=CH_2$$

wherein R is selected from the group consisting of hydrogen and methyl, Ar is an aromatic radical of the benzene series containing from 6–10 carbon atoms including the carbon atoms in any ring substituents on the aromatic nucleus, the ---$CR=CH_2$ group being attached directly to the carbon of the aromatic ring, from about 0.8–7.5 weight percent of an unsaturated vinyl monomer having a carboxylic acid group selected from the group consisting of acrylic acid, methacrylic acid and vinylbenzoic acid, any balance being another ethylenically unsaturated monomer copolymerizable therewith, heat plastifying the polymer in admixture with from about 1 to about 6 weight percent based on the weight of the polymer of (b) a member selected from the group consisting of alkyls and alkoxides, wherein the alkyl groups contain from 1–13 carbon atoms, of a metal selected from the group consisting of barium, magnesium, aluminum, zinc, calcium and strontium and subsequently adding from about 2 to about 60 parts by weight per hundred parts by weight of (a) plus (b) of a plasticizer.

8. The method of claim 7, wherein the copolymer has a major proportion of styrene chemically combined therein.

9. The method of claim 7, wherein (b) is an aluminum alkoxide.

10. The method of claim 9, wherein the aluminum alkoxide is aluminum isopropoxide.

11. The method of claim 10, wherein the copolymer has chemically combined therein about 98 weight percent styrene and about 2 weight percent methacrylic acid.

12. The method of claim 11, wherein the plasticizer is di-2-ethylhexyl phthalate.

References Cited by the Examiner
UNITED STATES PATENTS

| | | | |
|---|---|---|---|
| 1,792,102 | 2/31 | Lawson | 260—31.2 |
| 2,626,248 | 1/53 | Brown | 260—31.2 |
| 2,649,439 | 8/53 | Brown | 260—86.7 |
| 3,017,379 | 1/62 | Feild | 260—30.6 |

MORRIS LIEBMAN, *Primary Examiner.*